(12) United States Patent
Dawson et al.

(10) Patent No.: US 8,615,584 B2
(45) Date of Patent: Dec. 24, 2013

(54) RESERVING SERVICES WITHIN A CLOUD COMPUTING ENVIRONMENT

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 325 days.

(21) Appl. No.: 12/630,561

(22) Filed: Dec. 3, 2009

(65) Prior Publication Data

US 2011/0138051 A1 Jun. 9, 2011

(51) Int. Cl.
*G06F 15/173* (2006.01)
(52) U.S. Cl.
USPC ............................ 709/226; 709/218; 707/805
(58) Field of Classification Search
USPC ........................................................ 709/226
See application file for complete search history.

(56) References Cited

U.S. PATENT DOCUMENTS

| | | | |
|---|---|---|---|
| 6,628,629 B1 | 9/2003 | Jorgensen | |
| 7,010,601 B2 | 3/2006 | Yoshimine et al. | |
| 2001/0037279 A1* | 11/2001 | Yeo | 705/37 |
| 2002/0147974 A1* | 10/2002 | Wookey | 717/176 |
| 2003/0074393 A1* | 4/2003 | Peart | 709/203 |
| 2003/0097284 A1 | 5/2003 | Shinozaki | |
| 2003/0182413 A1* | 9/2003 | Allen et al. | 709/223 |
| 2006/0053378 A1* | 3/2006 | Fano et al. | 715/747 |
| 2006/0107035 A1* | 5/2006 | Tamas et al. | 713/150 |
| 2007/0198656 A1* | 8/2007 | Mazzaferri et al. | 709/218 |
| 2007/0271123 A1 | 11/2007 | Miyashita | |
| 2009/0055877 A1* | 2/2009 | Rhim | 725/87 |
| 2009/0066722 A1* | 3/2009 | Kriger et al. | 345/619 |
| 2009/0089438 A1* | 4/2009 | Agarwal et al. | 709/228 |
| 2009/0106055 A1 | 4/2009 | Demczuk et al. | |
| 2009/0187654 A1* | 7/2009 | Raja et al. | 709/224 |
| 2009/0216711 A1* | 8/2009 | Yu et al. | 707/2 |
| 2009/0235342 A1* | 9/2009 | Manion et al. | 726/7 |
| 2009/0248693 A1* | 10/2009 | Sagar et al. | 707/10 |
| 2009/0276771 A1* | 11/2009 | Nickolov et al. | 717/177 |
| 2009/0327905 A1* | 12/2009 | Mascarenhas et al. | 715/738 |
| 2010/0061250 A1* | 3/2010 | Nugent | 370/242 |

(Continued)

OTHER PUBLICATIONS

Mell, et al., "The NIST Definition of Cloud Computing", National Institute of Standards and Technology, Information Technology Laboratory, Version 15, Oct. 7, 2009, 2 pages.
Maitland, J., "Keeping Control Isn't Easy", Chapter 4: Cloud-Based Infrastructure, SearchCloudComputing.com, 13 pages.

(Continued)

*Primary Examiner* — Hamza Algibhah
(74) *Attorney, Agent, or Firm* — William E. Schiesser; Keohane & D'Alessandro, PLLC

(57) ABSTRACT

The present invention provides a solution for reserving Cloud services within a Cloud computing environment. Under the present invention, a customer/user can select a service for use sometime in the future. By scheduling in the future, the user can guarantee the service will be available for a specific price and set of service levels. One factor is that advanced reservation affects the cost of the service and the bounds by which the service levels of the service may change. The further in advance the job is scheduled, the tighter the bounds of the service level may be for a specific price. Advanced reservation may also guarantee execution on a preferred provider rather than being moved to a partner Cloud.

19 Claims, 6 Drawing Sheets

| | SERVICE | DATE | PROVIDER | PRICE | SERVICE LEVEL |
|---|---|---|---|---|---|
| 82A | EMAIL | JUNE 20 2009 | ACME | $10/DAY | 99% |
| 82B | EMAIL | JUNE 20 2009 | STANDARD | $12/DAY | 98% |
| 82N | STORAGE | AUGUST 1 2009 | STORAGE SALES | $50/GIGABYTE | 98% |

80

(56) References Cited

U.S. PATENT DOCUMENTS

| | | | |
|---|---|---|---|
| 2010/0069096 A1* | 3/2010 | Poola et al. | 455/466 |
| 2010/0131624 A1* | 5/2010 | Ferris | 709/221 |
| 2010/0191783 A1* | 7/2010 | Mason et al. | 707/822 |
| 2010/0250746 A1* | 9/2010 | Murase | 709/226 |
| 2010/0250747 A1* | 9/2010 | Karaoguz et al. | 709/226 |
| 2010/0318454 A1* | 12/2010 | Warncke et al. | 705/37 |
| 2010/0332262 A1* | 12/2010 | Horvitz et al. | 705/4 |
| 2011/0022642 A1* | 1/2011 | deMilo et al. | 707/805 |
| 2012/0016778 A1* | 1/2012 | Salle et al. | 705/27.1 |

OTHER PUBLICATIONS

Namjoshi, J. et al., "Service Oriented Architecture for Cloud based Travel Reservation Software as a Service", 2009 IEEE International Conference on Cloud Computing, Bangalore, India, Sep. 21-29, 2009, 8 pages.

"Cluster Resources' Moab Enables Department of Defense Cloud Computing Initiative", Clusterresources.com Press Release Aug. 11, 2008, 2 pages.

Gonzalez, L.M.V., "Advanced Reservation", Cloudtechnologies.org, Mar. 27, 2009.

* cited by examiner

RESERVING SERVICES WITHIN A CLOUD COMPUTING ENVIRONMENT

FIELD OF THE INVENTION

The present invention generally relates to Cloud computing. Specifically, the present invention relates to the reserving of Cloud services within a Cloud computing environment.

BACKGROUND OF THE INVENTION

Cloud computing has become a popular way to offer various Information Technology (IT) concepts as services. In one implementation, a user can request a service they desire and transact with a Cloud provider for the needed service. A Cloud provider's business opportunity can be limited or constrained by the physical resources they have installed, or by their capacity to procure additional resources in a timely and cost-efficient manner. Given that many similar services can be requested by multiple users, managing the use of services can become a challenge.

SUMMARY OF THE INVENTION

The present invention provides a solution for reserving Cloud services within a Cloud computing environment. Under the present invention, a customer/user can select a service for use sometime in the future. By scheduling in the future, the user can guarantee the service will be available for a specific price and set of service levels. One factor is that advanced reservation affects the cost of the service and the bounds by which the service levels of the service may change. The further in advance the job is scheduled, the tighter the bounds of the service level may be for a specific price. Advanced reservation may also guarantee execution on a preferred provider rather than being moved to a partner Cloud.

A first aspect of the present invention provides a method for reserving Cloud services within a Cloud computing environment, comprising: receiving a request for reserving a Cloud service within the Cloud computing environment; generating a list comprising a set of entries that correlates at least one Cloud service provider capable of providing the Cloud service with an associated price and service level; and reserving the Cloud service with a Cloud service provider from the list.

A second aspect of the present invention provides a service reservation manager for reserving Cloud services within a Cloud computing environment, comprising: a memory medium comprising instructions; a bus coupled to the memory medium; a processor coupled to the bus that when executing the instructions causes the service reservation manager to: receive a request for reserving a Cloud service within the Cloud computing environment; generate a list comprising a set of entries that correlates at least one Cloud service provider capable of providing the Cloud service with an associated price and service level; and reserve the Cloud service with a Cloud service provider from the list.

A third aspect of the present invention provides a computer readable storage medium containing a program product for reserving Cloud services within a Cloud computing environment, the computer readable storage medium comprising program code for causing a computer to: receive a request for reserving a Cloud service within the Cloud computing environment; generate a list comprising a set of entries that correlates at least one Cloud service provider capable of providing the Cloud service with an associated price and service level; and reserve the Cloud service with a Cloud service provider from the list.

A fourth aspect of the present invention provides a method for deploying a system for reserving Cloud services within a Cloud computing environment, comprising: providing a computer infrastructure being operable to: receive a request for reserving a Cloud service within the Cloud computing environment; generate a list comprising a set of entries that correlates at least one Cloud service provider capable of providing the Cloud service with an associated price and service level; and reserve the Cloud service with a Cloud service provider from the list.

BRIEF DESCRIPTION OF THE DRAWINGS

These and other features of this invention will be more readily understood from the following detailed description of the various aspects of the invention taken in conjunction with the accompanying drawings in which.

Figure 1:
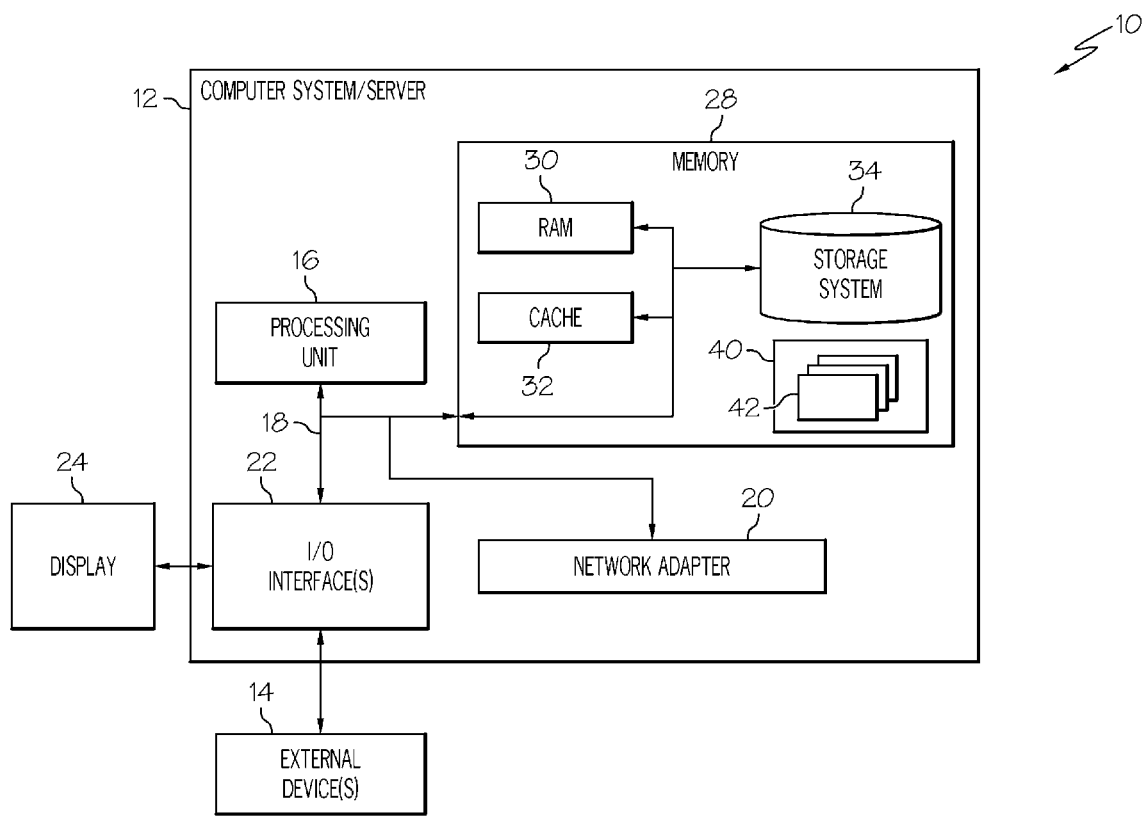
FIG. 1 shows a Cloud system node according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention has the following sections:

I. Cloud Computing Definitions
II. Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models (Also known as "Cloud implementations" or "Cloud types") are as follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more Clouds (private, community, or public) that remain unique entities but are bound together by standardized or proprietary technology that enables data and application portability (e.g., Cloud bursting for load-balancing between Clouds).

A Cloud computing environment is service oriented with a focus on statelessness, low coupling, modularity, and semantic interoperability.

II. Implementation of the Invention

As indicated above, the present invention provides a solution for reserving Cloud services within a Cloud computing environment. Under the present invention, a customer/user can select a service for use sometime in the future. By scheduling in the future, the user can guarantee the service will be available for a specific price and set of service levels. One factor is that advanced reservation affects the cost of the service and the bounds by which the service levels of the service may change. The further in advance the job is scheduled, the tighter the bounds of the service level levels may be for a specific price. Advanced reservation may also guarantee execution on a preferred provider rather than being moved to a partner Cloud.

In one embodiment, the invention is to allow users to make advanced reservations to Cloud service providers. Cloud providers must be able to correlate a price, level of service utility and warranty (service levels) to that service. By being able to make advanced reservations, the user should get be able to obtain better pricing and the provider a better estimation of current and future capacity and forecasting. Both the user and provider will have the ability to cancel reservations either with or without a charge. This charge may be affected by a subscription level of service previously agreed to (for example, a bronze rather than gold level of service results in a higher cancellation charge).

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on, that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
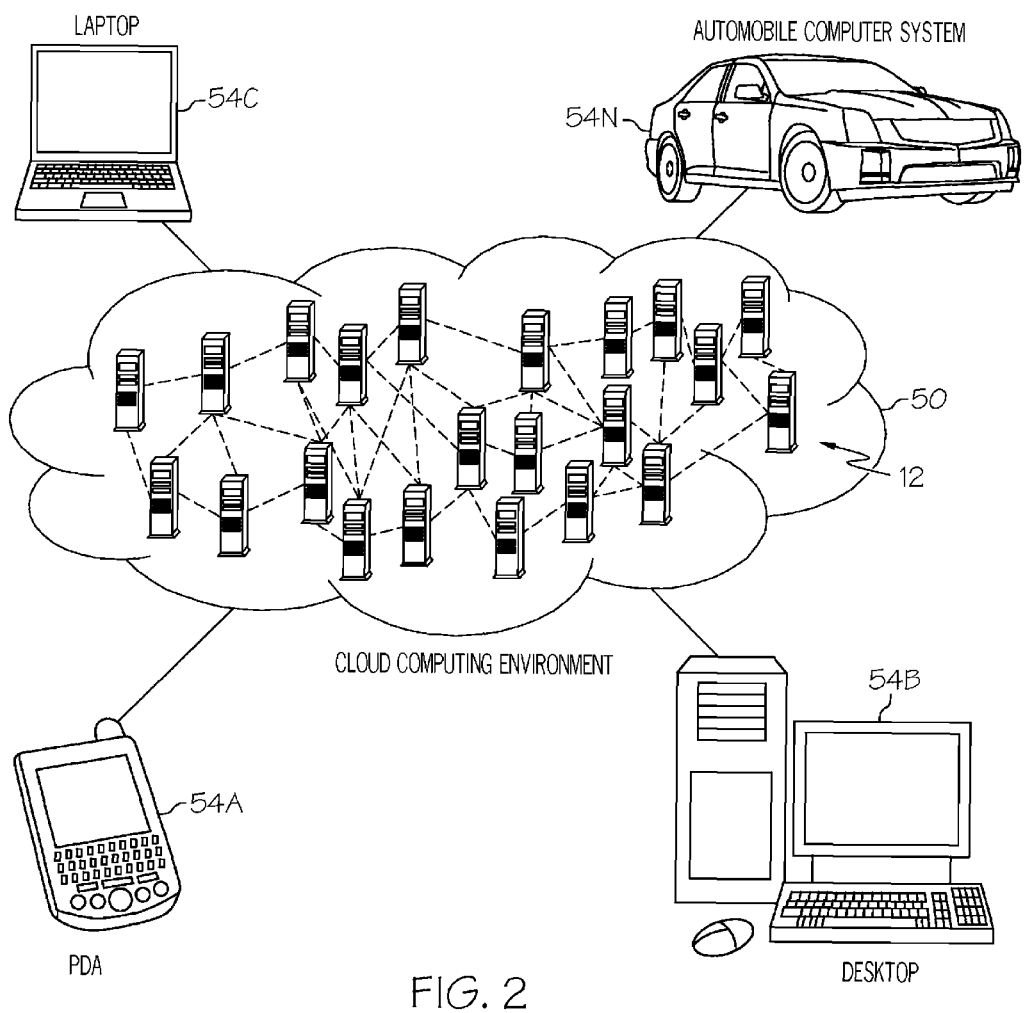
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50 so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
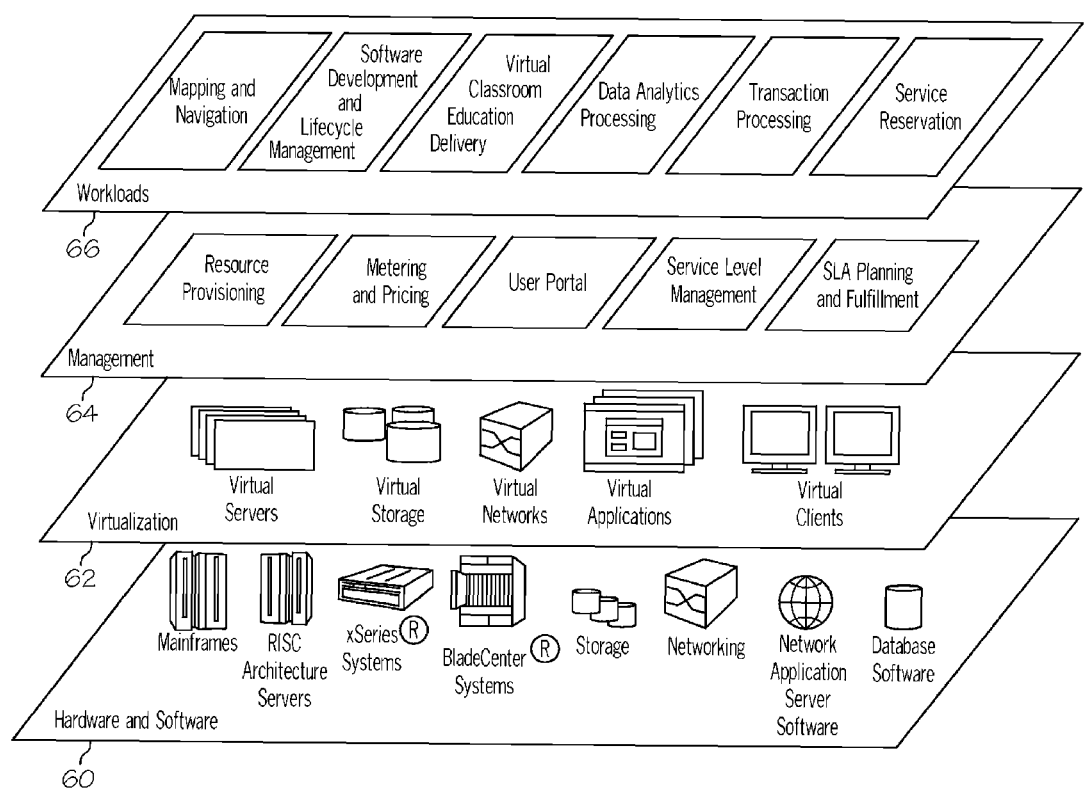
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only and the invention is not limited thereto. As depicted, the following layers and corresponding functions are provided:

Hardware and software layer 60 includes hardware and software components. Examples of hardware components include mainframes. In one example, IBM® zSeries® systems, RISC (Reduced Instruction Set Computer), and architecture based servers. In one example, IBM pSeries® systems, IBM xSeries® systems, IBM BladeCenter® systems, storage devices, and networks and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and Pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides prearrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and service reservation.

Service reservation functionality generally implements the teachings of the present invention. To this extent, service registration function(s) can be implemented as hardware, software (e.g., program modules 42 of utility/program 40), or a combination thereof. Regardless, the service registration functions of the present invention will be further described in conjunction with FIGS. 4-6, as well as the illustrative examples set forth below.

Illustrative Example

In a first example, assume that a Cloud user would like to initiate the Cloud service for email. This user may want to do email at 2:00 p.m. this afternoon. If he or she had reserved this request two days in advance, it may have cost $10 and would have had a guaranteed service level of 99%+/−1%. If the reservation was made one day in advance, it may cost $15 to have the same service level or the same cost to have a service level of 98%+/−2%.

One factor in this functionality is that the price and/or level of service can change based on advanced reservation. Another factor is the ability to lock in a specific Cloud provider rather than risk a chance of roaming to a partner or other third party Cloud provider.

Figure 4:
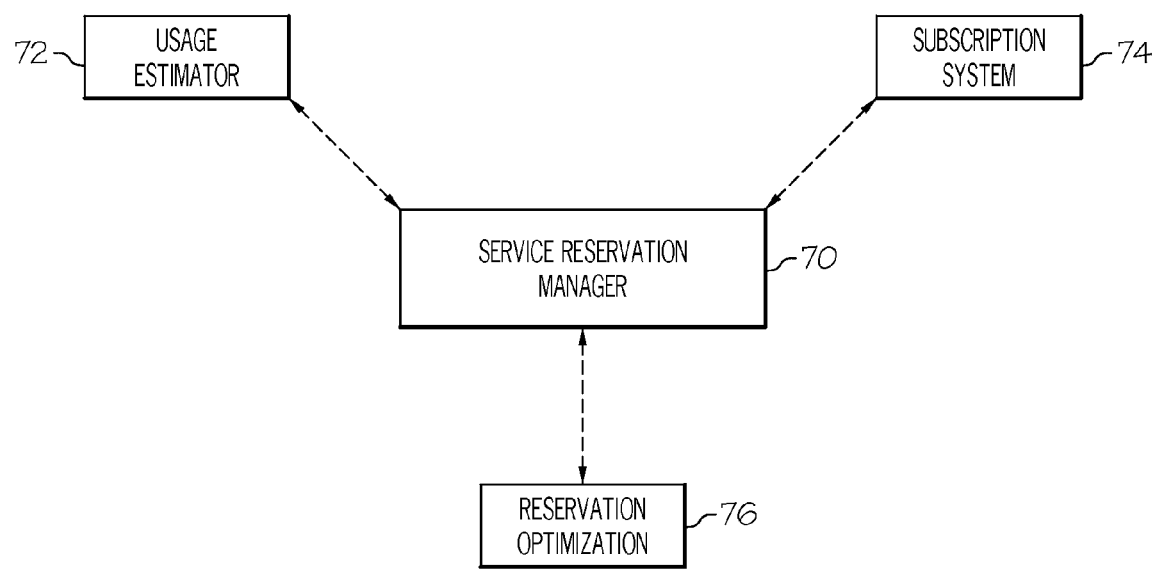
FIG. 4 shows an illustrative service reservation manager according to the present invention.

To implement these teachings, reference is made to FIG. 4. As depicted, FIG. 4 shows a service reservation manager 70, which includes and/or interacts with usage estimator 72, subscription system 74, and reservation optimization system 76. It should be understood that any of usage estimator 72, subscription system 74, and/or reservation optimization system 76 could be separate systems operated by one or more "operator/owners". Alternatively, such systems could be implemented collectively within service reservation manager 70. Regardless, the systems have the following functionality:

A user-driven usage estimator (or forecaster) 72 could be in place to automatically make decisions as to whether it is likely that a service is required at time point in the future. This estimator may use historical information or trending data to draw up a likely future demand for Cloud services. The better the estimator is, the more in the future and the more accurate advanced reservations can be make Subscription system 74 can track ongoing agreements between service providers and users. This subscription may be a running ongoing cost (for example, $10 per day) that gives the user priority, higher classes of service, or lower cancellation charges. The subscription level chosen may be optimized through reservation optimization system 76 described below. A subscription may include basic classes of service which affect available services, SLAB, costs, and cancellation charges.

Reservation optimization system 76 periodically analyzes past reservations and cancellations to determine whether good decisions are being made and advises on any changes to the subscribed to Cloud providers and/or subscription levels. For example, if a user has cancelled 50% of advanced reservations at a cost of $10 each time, it may determine that either a higher level of subscription is needed (to reduce the cancellation charges) or that the usage estimator should not try to make reservations as far in the future. Reservation optimization system 76 could be associated with the user and be periodically looking at available services, policies, and subscriptions from competing providers to determine whether a switch would lower cost or improve levels of service for the user. Reservation optimization system 76 should also make suggestions as to whether advanced reservation services should be fulfilled by a different provider than 'Just in Time' service requests if the price points make it effective to do so.

The invention could implement the following set of steps, combined with the systems above, to create an effective advanced reservation system. First, the Cloud providers should have a system in place that forecasts likely demand for services, cancellation policy for advanced reservations and charges for each. The provider may provide the following illustrative rules along with different subscription levels (e.g., GOLD, SILVER, BRONZE):

Email Service:

Book in 20 days time for $10 with an SLA of 99%+/−1%. Cancellation within 7 days will cost $1

Book in 10 days time for $15 with an SLA of 99%+/−1%. Cancellation within 4 days will cost $2

Book in 10 days time for $10 with an SLA of 98%+/−2%. No Cancellation allowed.

Book now for $50 with an SLA of %98+/−2%. No Cancellation allowed.

If the user has a GOLD level subscription with me, then these prices are discounted 50%

If the user has a SILVER level subscription with me, then these prices are discounted by 10%

The provider can "publish" this information in a service catalog for access either directly by users or other systems.

The following steps are illustrative steps for reserving a Cloud service under the present invention:

(1) Service reservation manager 70 first receives a list of potential required services from the user site usage estimator system 72.

(2) Service reservation manager 70 receives a list of current subscriptions to providers from the subscription system 74.

(3) Prioritized based on subscriptions to Cloud providers first, Service reservation manager 70 connects to the service catalog of the provider and determines whether a service is available at the time specified from the usage estimator system (4) If a service is available, it creates an entry in a list (e.g., a row in a table similar to but not limited to):

Service Required Time Required Provider Subscription? SLA Cancellation Policy Price Likelihood of Cancellation

---

Email service Aug. 20, 2009 Acme1 Yes - Gold 98% 7 days $10 50%

---

(5) The algorithm builds up the table through each required set of services to build a full list of available advanced reservations similar to the following:

Service Required Time Required Provider Subscription? SLA Cancellation Policy Price Likelihood of Cancellation

---

Email service Aug. 20, 2009 Acme1 Yes - Gold 98% 7 days $10 50%
Provider2 No 99% 21 days $15
Other1 No 95% 15 days $50
DTP service Sep. 1, 2009 Acme1 Yes - Gold 99% 7 days $50 25%
. . .
. . .
. . .

---

(6) Once completed, optimizer 76 then ranks the available services based on a weighted scheme. This scheme may be customizable by the user or optimized based on past experience. Perhaps the price is more important than the service level and so is given a higher weighing. The price and likelihood of cancellation, together, gives a cost/risk figure for each service provider.

(7) Based on the completed weighed table, optimizer 76 determines which providers to reach out to and when to make the reservations. It may either provide this information back to the user or automatically make the requests.

(8) If the estimator determines that a request is no longer needed, the optimizer then may perform the cancellation. It then updates the likelihood of cancellation such that next time, it is less likely to make the reservation.

Figure 5:
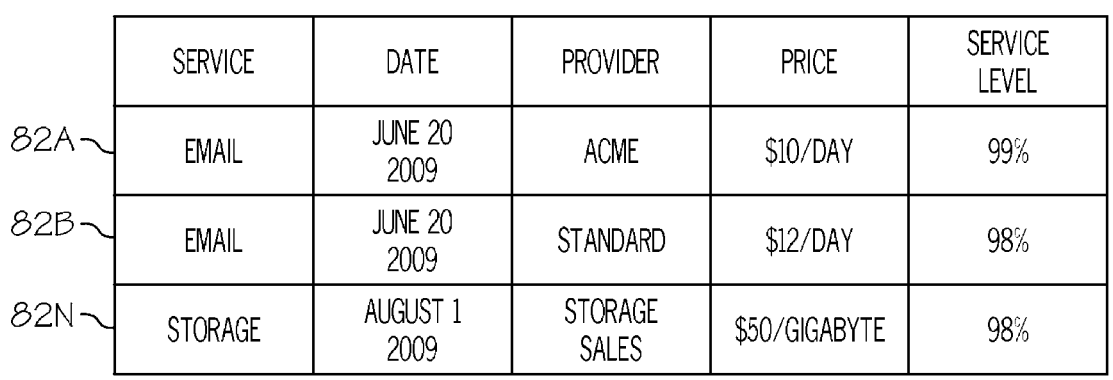
FIG. 5 shows an illustrative list of potential Cloud service providers with associated prices and service levels according to the present invention.

Referring to FIG. 5, another example of a list/table 80 as provided under the present invention is shown. As shown, list 80 comprises a set of entries 82A-N and correlates Cloud services with service providers along with their associated price and available service levels. Entries 82A-N further indicate dates on which the respective Cloud services are requested and/or reserved. These dates can be drawn from specific requests (e.g., from users or as set forth in subscription agreements). Alternatively, these dates can be drawn from historical data (e.g., by usage estimator 72). In the case of the latter, the entries would represent a predicted usage.

Figure 6:
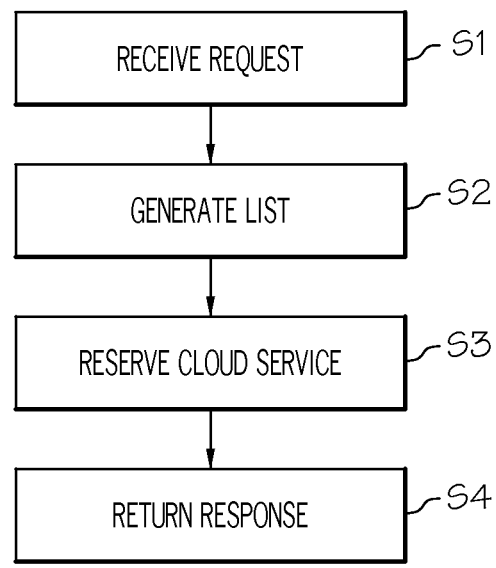
FIG. 6 depicts a method flow diagram according to the present invention.

Referring now to FIG. 6, a level method flow diagram according to the present invention is shown. As depicted, in step S1, a request for reserving a Cloud service is received within the Cloud computing environment. Under the present invention, the request can be received from a Cloud service usage estimator that estimates potential Cloud service needs (e.g., based on least one of the following: historical data, trending data, or subscription agreements between Cloud service users and Cloud service providers). Alternatively, the request can be received from a user in need of the Cloud service. In any event, in step S2, a list is generated that comprises a set (at least one) of entries that correlates at least one Cloud service provider capable of providing the Cloud service with an associated price and service level is generated. The set of entries can be ranked within the list using a weighted scheme (e.g., that is based on needs of the user in need of the Cloud service). In step S3, the Cloud service is reserved with a Cloud service provider from the list. In step S4, a response can be returned to the user in need of the service, the response identifying the Cloud service provider and its associated price and service level.

While shown and described herein as a Cloud service reservation solution, it is understood that the invention further provides various alternative embodiments. For example, in one embodiment, the invention provides a computer-readable/useable storage medium that includes computer program code to enable a computer infrastructure to provide Cloud service reservation functionality as discussed herein. To this extent, the computer-readable/useable storage medium includes program code that implements each of the various processes of the invention. It is understood that the terms computer-readable storage medium or computer-useable storage medium comprise one or more of any type of physical embodiment of the program code. In particular, the computer-readable/useable storage medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide Cloud service reservation functionality. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing Cloud service reservation functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers. Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for reserving Cloud services within a Cloud computing environment, comprising:
   receiving a request from a requester for reserving a Cloud service within the Cloud computing environment;
   correlating at least one Cloud service provider capable of providing the Cloud service with an associated price and service level;
   ranking the at least one Cloud service provider according to a set of factors, each of the set of factors being weighted with respect to one another based on at least one of: user customization and historical data;
   changing at least one of the associated price and service level based on a length of time the Cloud service is reserved in advance of a providing of the Cloud service;
   recommending, based on historical data relating to cancelations by the requester, a time frame in which a reservation may be booked; and
   booking a reservation of the Cloud service with a Cloud service provider within the recommended time frame based on the ranking.

2. The method of claim 1, the requester being a Cloud service usage estimator that estimates potential Cloud service needs based on least one of the following: historical data, trending data, or subscription agreements between Cloud service users and Cloud service providers.

3. The method of claim 1, the requester being a user in need of the Cloud service.

4. The method of claim 3, the associated price and service level being based on a subscription agreement between the user and the at least one Cloud service provider.

5. The method of claim 3, further comprising returning a response to the user, the response identifying the Cloud service provider and its associated price and service level.

6. The method of claim 1, the weighted schema being based on needs of a requester requesting the Cloud service.

7. A service reservation manager for reserving Cloud services within a Cloud computing environment, comprising:
   a memory medium comprising instructions;
   a bus coupled to the memory medium;
   a processor coupled to the bus that when executing the instructions causes the service reservation manager to:
      receive a request from a requester for reserving a Cloud service within the Cloud computing environment;
      correlate at least one Cloud service provider capable of providing the Cloud service with an associated price and service level;
      rank the at least one Cloud service provider according to a set of factors, each of the set of factors being weighted with respect to one another based on at least one of: user customization and historical data;
      change at least one of the associated price and service level based on a length of time the Cloud service is reserved in advance of a providing of the Cloud service;
      recommend, based on historical data relating to cancelations by the requester, a time frame in which a reservation may be booked;
      book a reservation of the Cloud service with a Cloud service provider within the recommended time frame based on the ranking.

8. The service reservation manager of claim 7, the requester being a Cloud service usage estimator that estimates potential Cloud service needs based on least one of the following: historical data, trending data, or subscription agreements between Cloud service users and Cloud service providers.

9. The service reservation manager of claim 7, the requester being a user in need of the Cloud service.

10. The service reservation manager of claim 9, the associated price and service level being based on a subscription agreement between the requester and the at least one Cloud service provider.

11. The service reservation manager of claim 9, the Cloud service manager being further caused to return a response to the user, the response identifying the Cloud service provider and its associated price and service level.

12. The service reservation manager of claim 7, the weighted schema being based on needs of a user requesting the Cloud service.

13. A computer readable storage medium containing a program product for reserving Cloud services within a Cloud computing environment, the computer readable medium comprising program code for causing a computer to:
   receive a request from a requester for reserving a Cloud service within the Cloud computing environment;
   correlate at least one Cloud service provider capable of providing the Cloud service with an associated price and service level;
   rank the at least one Cloud service provider according to a set of factors, each of the set of factors being weighted with respect to one another based on at least one of: user customization and historical data;
   change at least one of the associated price and service level based on a length of time the Cloud service is reserved in advance of a providing of the Cloud service;
   recommend, based on historical data relating to cancelations by the requester, a time frame in which a reservation may be booked; and
   book the reservation of the Cloud service with a Cloud service provider within the recommended time frame based on the ranking.

14. The computer readable storage medium containing the program product of claim 13, the requester being a Cloud service usage estimator that estimates potential Cloud service needs based on least one of the following: historical data, trending data, or subscription agreements between Cloud service users and Cloud service providers.

15. The computer readable storage medium containing the program product of claim 13, the requester being a user in need of the Cloud service.

16. The computer readable storage medium containing the program product of claim 15, the associated price and service level being based on a subscription agreement between the requester and the at least one Cloud service provider.

17. The computer readable storage medium containing the program product of claim 15, the computer readable medium further comprising program code for causing the computer to return a response to the user, the response identifying the Cloud service provider and its associated price and service level.

18. The computer readable storage medium containing the program product of claim 13, the weighted schema being based on needs of a user requesting the Cloud service.

19. A method for deploying a system for reserving Cloud services within a Cloud computing environment, comprising:
   providing a computer infrastructure being operable to:
      receive a request from a requester for reserving a Cloud service within the Cloud computing environment;
      correlate at least one Cloud service provider capable of providing the Cloud service with an associated price and service level;
      rank the at least one Cloud service provider according to a set of factors, each of the set of factors being weighted with respect to one another based on at least one of: user customization and historical data;

change at least one of the associated price and service level based on a length of time the Cloud service is reserved in advance of a providing of the Cloud service;

recommend, based on historical data relating to cancelations by the requester, a time frame in which a reservation may be booked; and make the reservation of the Cloud service with a Cloud service provider within the recommended time frame based on the ranking.

* * * * *